United States Patent
Sakazawa et al.

[11] Patent Number: 6,075,900
[45] Date of Patent: Jun. 13, 2000

[54] METHOD OF AND APPARATUS FOR CODED MOVING PICTURE DATA HIERARCHY FORMATION

[76] Inventors: Shigeyuki Sakazawa, 21-2, Ichigaya-tamachi 2-chome, Shinjuku-ku, Tokyo; Yasuhiro Takishima, 1-1-113, Nakamura 2-chome, Nerima-ku, Tokyo; Masahiro Wada, 11-17, Jomyoji 3-chome, Kamakura-shi, Kanagawa, all of Japan

[21] Appl. No.: 09/007,223

[22] Filed: Jan. 14, 1998

[30] Foreign Application Priority Data

Oct. 2, 1997 [JP] Japan ................................. 9-041708

[51] Int. Cl.[7] .............................. G06K 9/36; G06K 9/46; H04N 7/12; H04N 1/415
[52] U.S. Cl. ........................... 382/250; 382/236; 382/238; 382/240; 348/397; 348/398; 348/408; 358/432
[58] Field of Search .................................... 382/236, 238, 382/240, 250; 348/397, 398, 399, 426, 395, 403, 408; 358/432, 433

[56] References Cited

U.S. PATENT DOCUMENTS

| | | | |
|---|---|---|---|
| 5,414,469 | 5/1995 | Gonzales et al. | 348/408 |
| 5,515,107 | 5/1996 | Chiang et al. | 348/426 |
| 5,581,310 | 12/1996 | Vinekar et al. | 348/718 |
| 5,703,889 | 12/1997 | Shimoda et al. | 714/809 |
| 5,748,787 | 5/1998 | Sugiyama | 348/398 |
| 5,784,526 | 7/1998 | Shimoda et al. | 348/397 |
| 5,796,438 | 8/1998 | Hosono | 348/458 |
| 5,847,767 | 12/1998 | Ueda | 348/423 |
| 5,903,734 | 5/1999 | Chida | 709/232 |

OTHER PUBLICATIONS

Gao, et al. "An Efficient Hierarchical VBR Video Coder Over ATM Networks", IEEE, pp. 1910–1914, 1995.

*Primary Examiner*—Phuoc Tran
*Assistant Examiner*—Daniel G Mariam

[57] ABSTRACT

This invention aims to form hierarchies of coded moving picture data in a simple method or apparatus. An I, P and B separator separates I, P and B picture data from coded moving picture data. A first to a third header/low/high separator separate headers and low and high DCT data components of the separated I, P and B picture data, and hierarchy forming means assigns the outputs of the separators for a 1-st to a 6-th hierarchy by supplying the outputs to packetizers therefor. The packetizers packetize the assigned data, and send out the packetized data on communication lines for the 1-st to 6-th hierarchies. For example, low frequency components of I picture data are provided as the 1-st hierarchy, high frequency components of I picture data are provided to the 2-nd hierarchy, low frequency components of P picture data are provided as the 3-rd hierarchy, high frequency components of P picture data are provided as the 4-th hierarchy, low frequency components of B picture data are provided as the 5-th hierarchy, and high frequency components of P picture data are provided as the 6-th hierarchy.

12 Claims, 13 Drawing Sheets

[I, P AND B PREDICTION CONSTITUTION]

| HIERARCHY | 1 | 2 | 3 | 4 | 5 | 6 |
|---|---|---|---|---|---|---|
| PICTURE DATA | I (LOW) | I (HIGH) | P (LOW) | P (HIGH) | B (LOW) | B (HIGH) |

| HIERARCHY | 1 | 2 | 3 | 4 |
|---|---|---|---|---|
| PICTURE DATA | I (LOW) + P (LOW) | I (HIGH) + P (HIGH) | B (LOW) | B (HIGH) |

| HIERARCHY | 1 | 2 | 3 | 4 | 5 |
|---|---|---|---|---|---|
| PICTURE DATA | I(LOW)+P(LOW) | I(HIGH)+P(MIDDLE) | P(HIGH) | B(LOW) | B(HIGH) |

METHOD OF AND APPARATUS FOR CODED MOVING PICTURE DATA HIERARCHY FORMATION

BACKGROUND OF THE INVENTION

1. Field of the Invention

This invention relates to method of and apparatus for coded moving picture data hierarchy formation and, more particularly, to method of and apparatus for coded moving picture data hierarchy formation, which may be used for moving picture transmission systems employed for television conference communication or the like under such circumstances that various different networks are interconnected.

2. Description of the Prior Art

In a prior art hierarchical coding system, low resolution picture data obtained from original moving picture, such as those in MPEG-2space scalability, are subjected to ordinary motion compensation (MC) and DCT coding, for motion prediction in the MC and DCT coding of the original moving picture.

Figure 17:
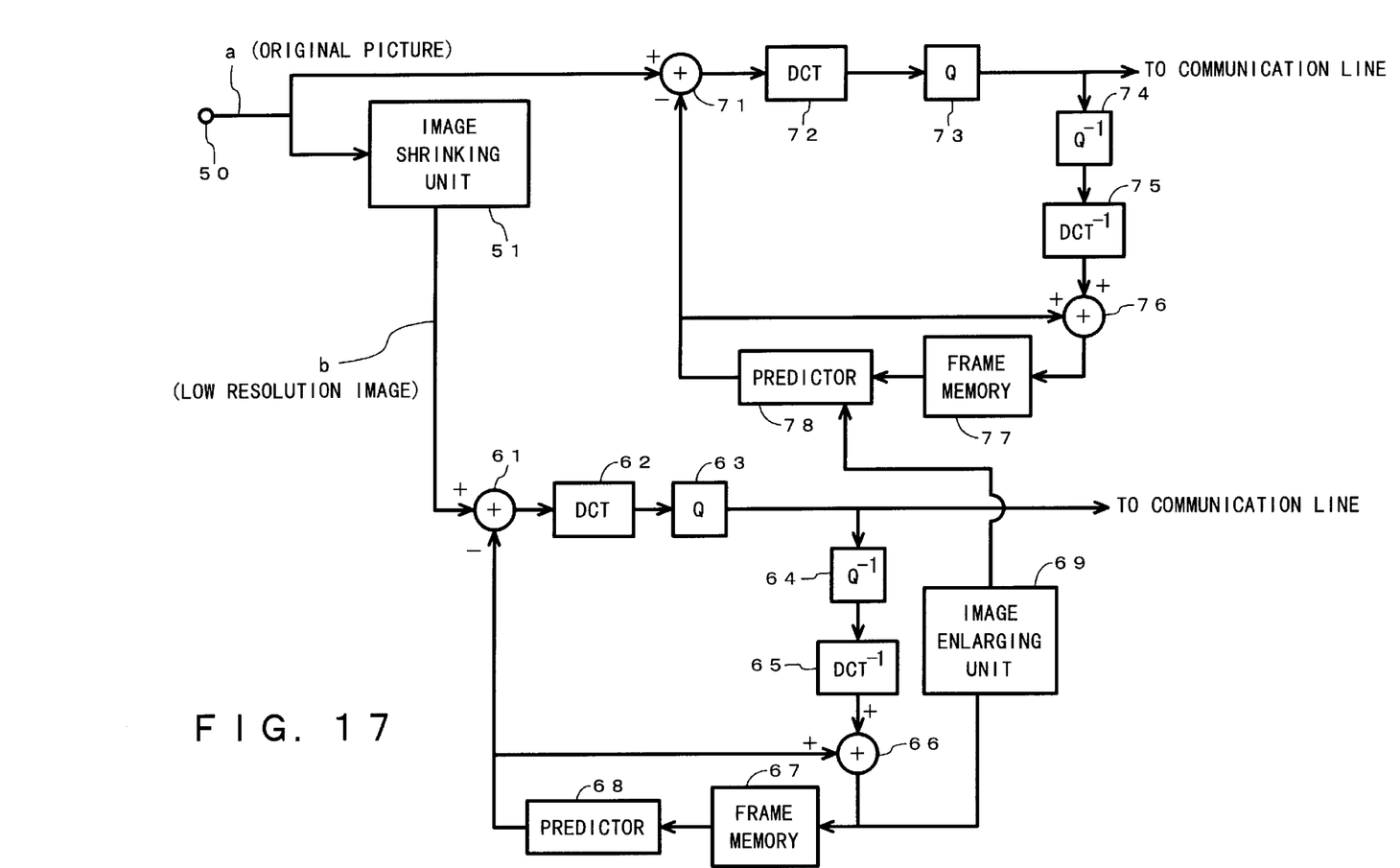
FIG. 17 is a block diagram showing a prior art hierarchical coding system.

FIG. 17 shows the prior art hierarchical coding system. One-frame picture data a is supplied to an input terminal 50. An image shrinking unit 51 shrinks the vertical and horizontal sizes of the picture data to, for instance, one half, and supplies the shrinked picture data as low resolution picture data b to a first coder. The first coder includes a subtracter 61, a DCT transformer 62, a quantizer 63, an inverse quantizer 64, an inverse DCT transformer 65, an adder 66, a frame memory 67 and a motion predictor 68. Output data from the quantizer 63 is supplied as first important data to a transmission line.

The one-frame picture data a is also supplied to a second coder. The second coder also includes a subtracter 71, a DCT transformer 72, a quantizer 73, an inverse quantizer 74, an inverse DCT transformer 75, an adder 76, a frame memory 77 and a motion predictor 78. Output data a from the quantizer 73 is supplied as second important data to the transmission line. In the second coder, for motion prediction the motion predictor 78 is supplied with data, which has been obtained by enlarging the output of the adder 66 of the first coder to the same size as the original picture with picture enlargement processer 69.

In the above prior art hierarchical coding system, the operations of the MC and DCT coding should be done twice in total, i.e., in the first and second coders. Therefore the construction and operation of the system are complicated. In addition, in the above prior art hierarchical coding system two different kinds of picture data, i.e., low and high resolution picture data b and a, should be coded. This means that the amount of picture data to be coded is increased by 25% (in case when the low resolution picture data b is one half the high resolution picture data in both the vertical and horizontal sizes), thus reducing the coding efficiency.

SUMMARY OF THE INVENTION

An object of the invention is to provide a method of and an apparatus for decoded moving picture data hierarchy formation, which can solve the above problems inherent in the prior art and permit decoded moving picture data hierarchy formation in a simple method or with a simple apparatus without coding efficiency deterioration.

To attain the above object of the invention, a first feature of the invention resides in a method of coded moving picture data hierarchy formation, in which I, P and B picture data of moving picture and low and high DCT components thereof are used in combination for the hierarchy formation.

A second feature of the invention resides in the method of coded moving picture data hierarchy formation, in which low frequency components of I picture data are assigned to a first hierarchy, high frequency components of I picture data are assigned to a second hierarchy, low frequency components of P picture data are assigned to a third hierarchy, high frequency components of the P picture data are assigned to a fourth hierarchy, low frequency components of B picture data are assigned to a fifth hierarchy, and high frequency components of the P picture data are assigned to a sixth hierarchy.

A third feature of the invention resides in the method of coded moving picture data hierarchy formation, in which low frequency components of I picture data and low frequency components of P picture data are assigned to a first hierarchy, high frequency components of I picture data and high frequency components of P picture data are assigned to a second hierarchy, low frequency components of B picture data are assigned to a third hierarchy, and high frequency components of B picture data are assigned to a fourth hierarchy.

A fourth feature of the invention resides in the method of coded moving picture data hierarchy formation, in which low frequency components of I picture data and low frequency components of P picture data are assigned to a first hierarchy, high frequency components of I picture data and intermediate frequency components of P picture data are assigned to a second hierarchy, high frequency components of P picture data are assigned to a third hierarchy, low frequency components of B picture data are assigned to a fourth hierarchy, and high frequency components of B picture data are assigned to a fifth hierarchy.

These features of the invention permit the coded moving picture data hierarchy formation by combining the I, B and P picture data of moving picture and low and high DCT components thereof. It is thus possible to obtain the hierarchy formation easily and without coding efficiency deterioration.

DETAILED DESCRIPTION OF THE PREFERRED EMBODIMENTS

Figure 1:
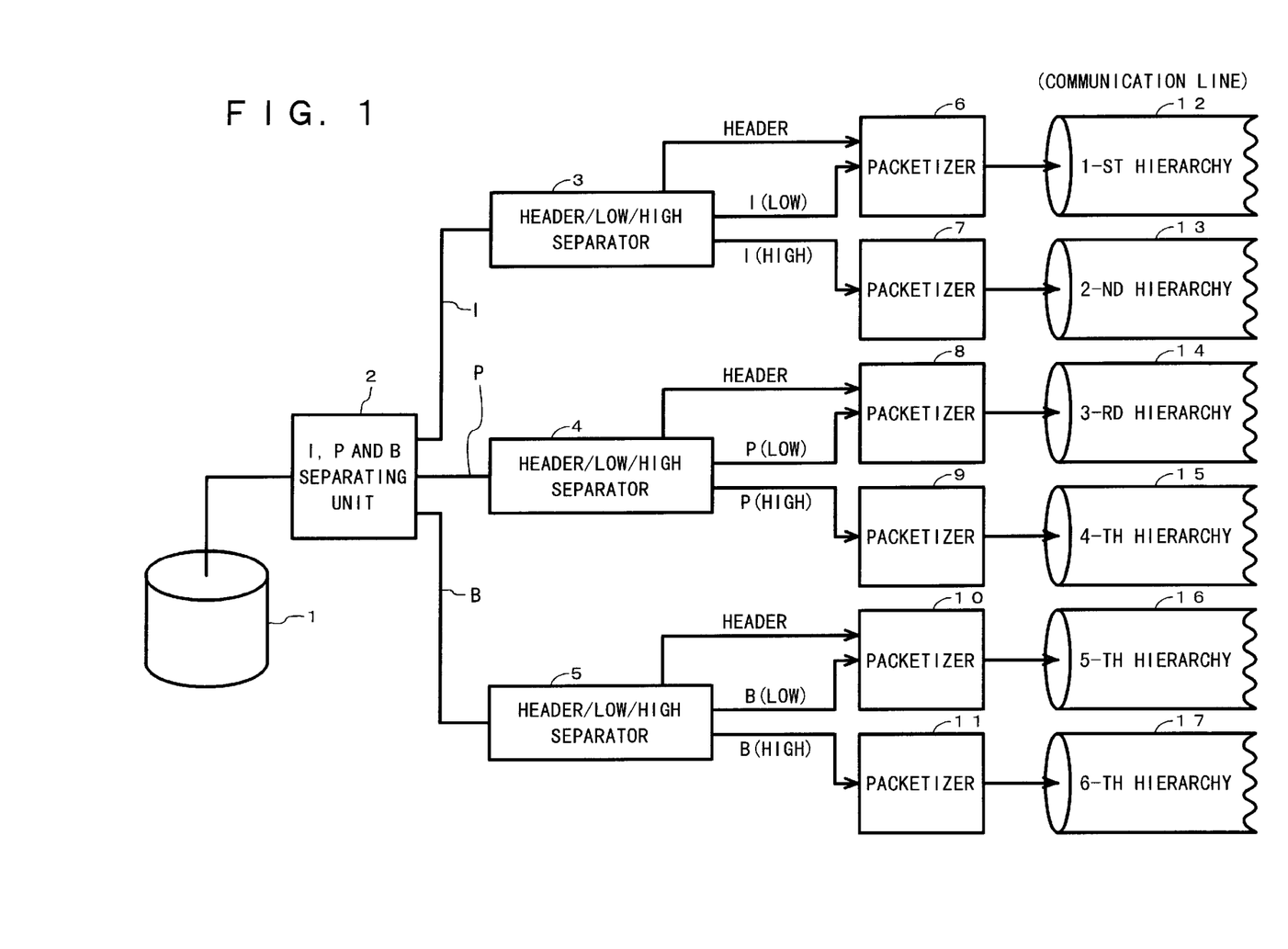
FIG. 1 is a block diagram showing a first embodiment of the invention.

The invention will now be described in detail with reference to the accompanying drawings. FIG. 1 is a block diagram showing one embodiment of the invention.

Figure 2:
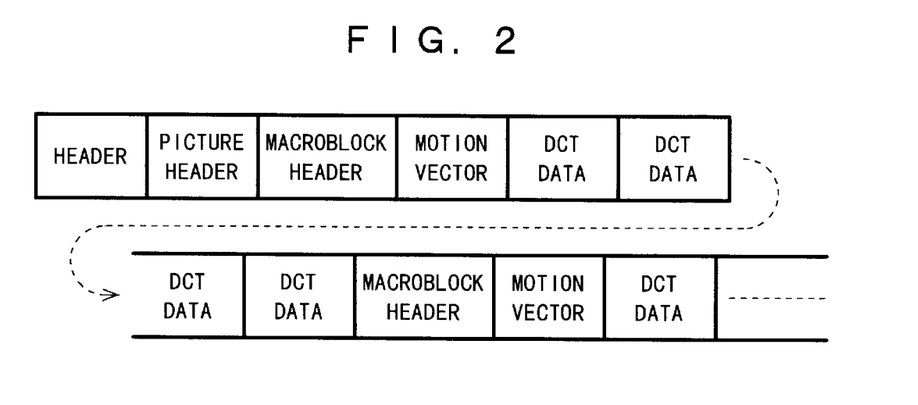
FIG. 2 is a view showing the configuration of coded moving picture data.

Referring to the Figure, reference numeral 1 designates coded moving picture data which has been obtained from a coder or stored in a memory. FIG. 2 shows an example of configuration of one coded moving picture data frame. This example of the picture data frame comprises header, picture header, macro-block header, motion vector, DCT data piece, . . . , DCT data piece, macroblock header, motion vector, DCT data piece, . . . . Each macroblock is formed by 16×16 pixels. Each motion vector is a motion vector of the macroblock. Each DCT data comprises an 8×8 pixel matrix.

Figure 3:
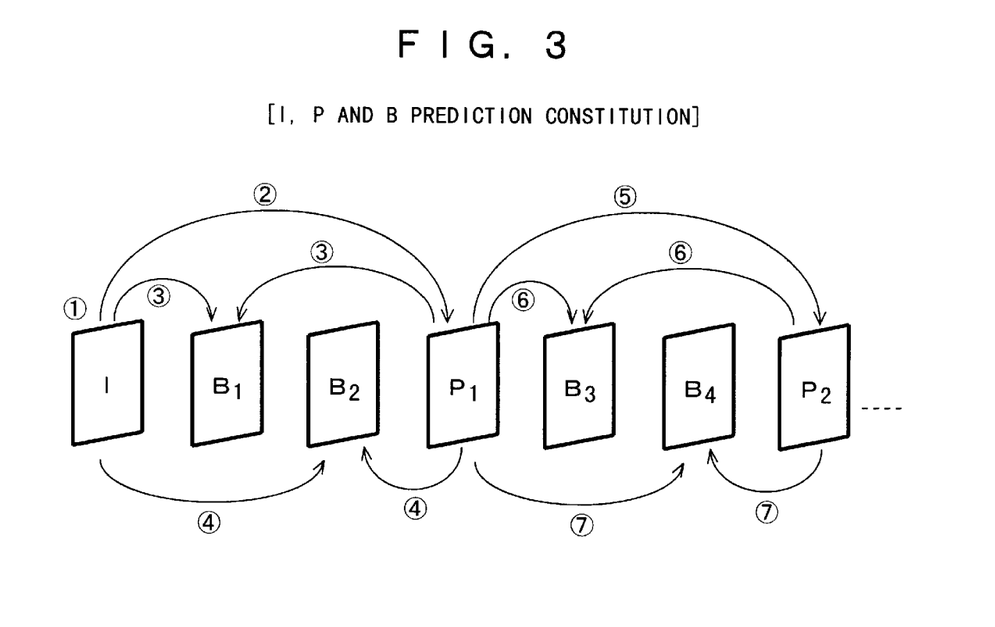
FIG. 3 is a view referred to the description of an I, P and B prediction constitution.

The picture headers include identifiers of the I, P and B pictures. MPEG has a well-known I, P and B prediction constitution as shown in FIG. 3. An I picture data frame is coded as the first frame, then a P picture data frame is coded as the second frame, then B picture data frames are coded as the third and fourth frames, then a P picture data frame is coded as the fifth frame, then B picture data frames are coded as the sixth and seventh frames, and so forth. An I picture data frame appears again as the sixteenth frame. It will be seen that one cycle of the picture prediction constitution consists of fifteen frames and takes one-half second (i.e., 500 milliseconds). Numerals encircled with a circle in FIG. 3 show an order of the picture prediction.

An I, P and B separator 2 shown in FIG. 1 separates I, P and B picture data as components of the coded moving picture data 1 according to the picture header thereof. The separated I, P and B picture data are supplied to a 1-st to a 3-rd header/low/high separator 3 to 5, respectively. The 1-st header/low/high separator 3 separates picture header, macroblock headers and low and high frequency DCT components of the I picture data. The 2-nd and 3-rd header/low/ high separators 4 and 5 separate picture headers, macroblock headers, motion vectors and low and high frequency DCT components of the P and B picture data, respectively.

Figure 4:
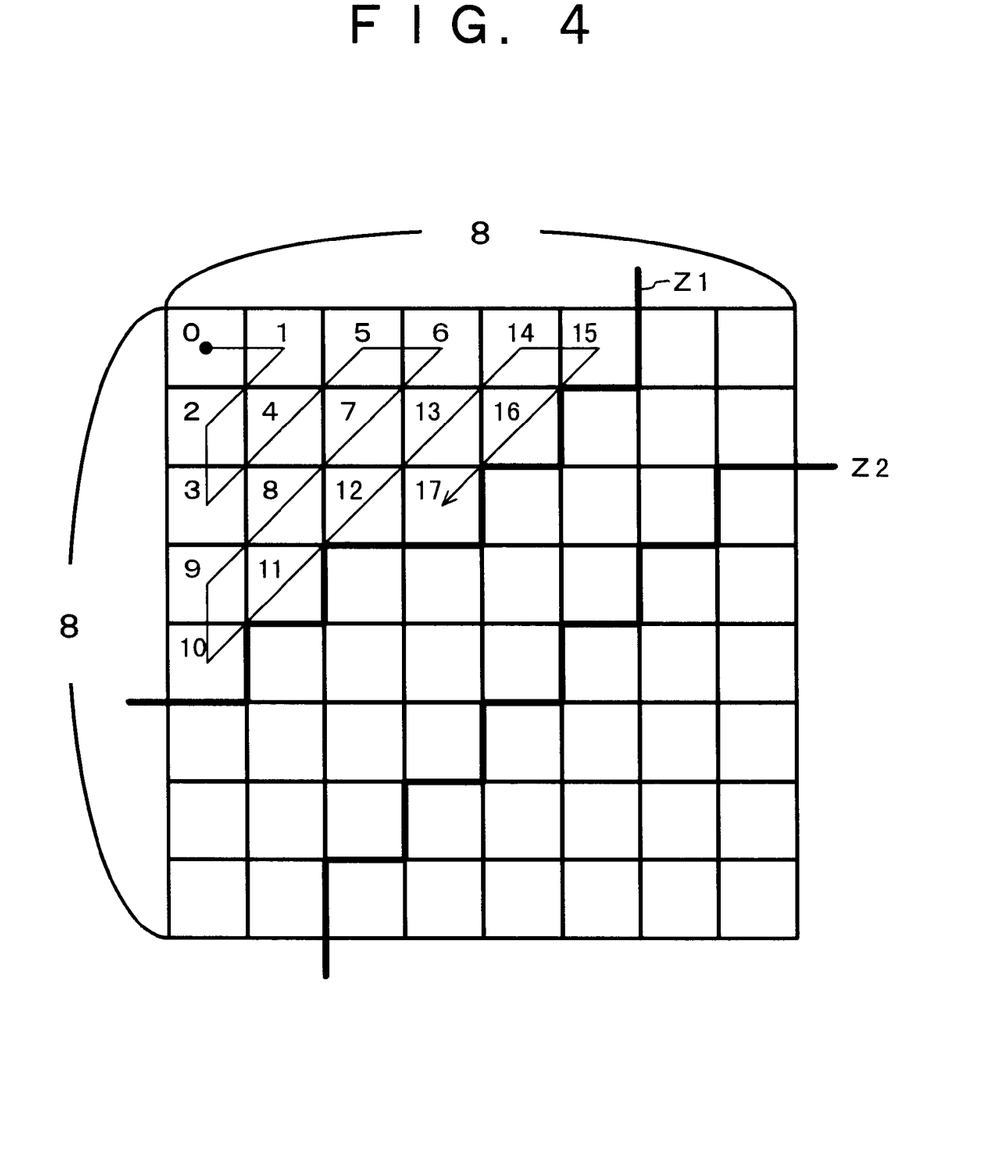
FIG. 4 is a view referred to the description of low, intermediate and high DCT components.

The separation of the low and high frequency DCT components, may be made in correspondence to serial numbers of zig-zag-scanned DCT matrix pixels, for instance as shown in FIG. 4. In this case, in which the DCT matrix is an 8×8 pixel matrix, the separation is made that the 17-th and lower zig-zag-scanned pixels are of low frequency DCT component, and that the higher zig-zag-scanned pixels are of high frequency DCT component. In this case, the left upper area over bold line z1 is a low frequency DCT component area, and the right lower area is a high frequency DCT component area.

Figure 5:
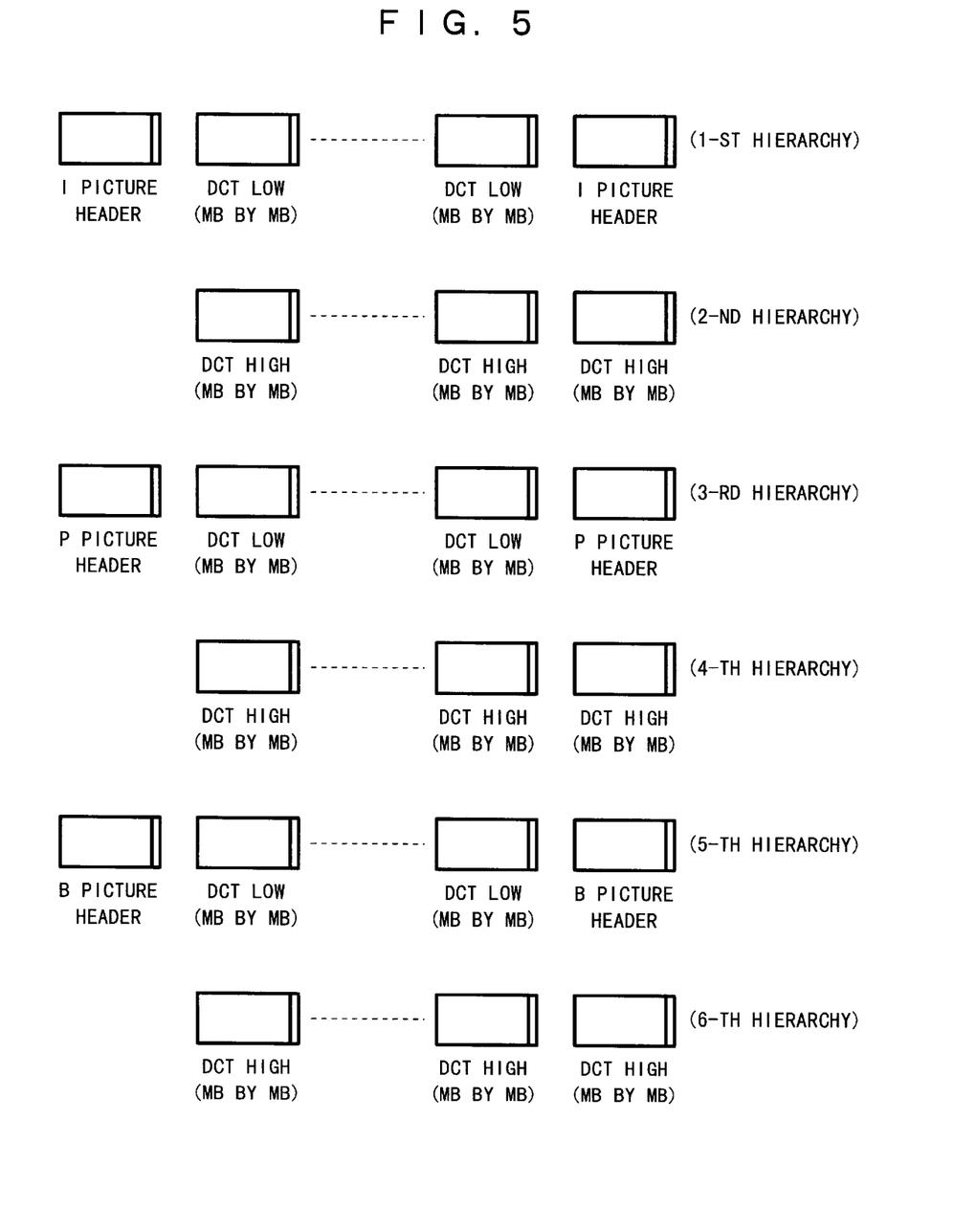
FIG. 5 is a view referred to the description of a time sequence of data assigned to hierarchies in the first embodiment.

Output data from the 1-st to 3-rd header/low/high separators 3 to are assigned by hierarchy forming means (not shown) to 1-st to 6-th hierarchies and distributed to packetizers 6 to 11, provided for a 1-st to a 6-th hierarchy, respectively. The packetizer 6 for the 1-st hierarchy, sequentially packetizes 1-st hierarchy data as shown in FIG. 5. Specifically, the packetizer 6 sequentially packetizes I picture header, low frequency DCT component, . . . , low frequency DCT component, . . . , low frequency DCT component in one frame. The low frequency DCT components are packetized macroblock (MB) by macroblock. In the P and B picture data that are packetized, contain motion vectors. The packetized data from the packetizer 6, is sent out to a communication line 12. The packetizer 7, for the 2-nd hierarchy, MB-by-MB packetizes only high frequency DCT components of I picture data in one frame, and sends out the packetized data to a communication line 13. The low and high DCT components are MB-by-MB packetized in the other packetizers as well.

The packetizer 8, for the 3-rd hierarchy, packetizes P picture header, low frequency DCT component, . . . , low frequency DCT component in one frame, and sends out the packetized data to a communication line 14. The packetizer 9, for the 4-th hierarchy, packetizes only high frequency DCT componets of P picture data in one frame, and sends out the packetized data to a communication line 15. The packetizer 10, for the 5-th hierarchy, packetizes B picture header, low frequency DCT component, . . . , low frequency DCT component in one frame, and sends out the packetized data to a communication line 16. The packetizer 11, for the 6-th hierarchy, packetizes only high frequency DCT components of B picture data in one frame, and sends out the packetized data to a communication line 17.

Figure 6:
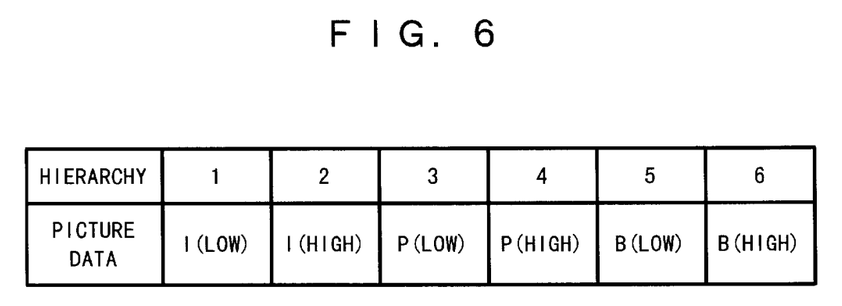
FIG. 6 is a view referred to in the description of the hierarchy-by-hierarchy transmitted data the first embodiment.

FIG. 6 summarizes the operation described above. As shown, data is sent out in six hierarchies. In the Figure, higher preference orders are given to hierarchies of lower orders.

Figure 7:
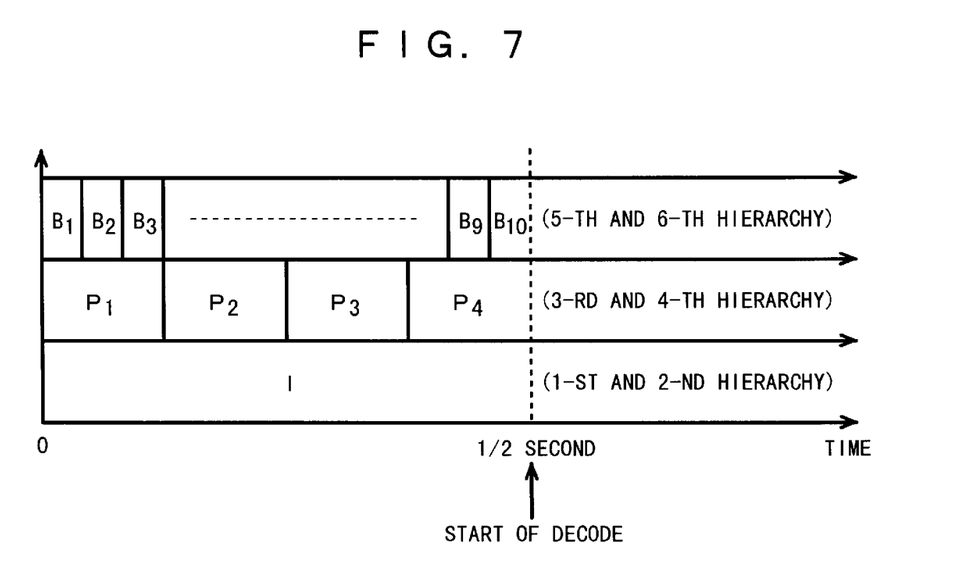
FIG. 7 is a time chart of the hierarchy-by-hierarchy transmitted data in the first embodiment.

FIG. 7 shows a timing chart of transmission of the packetized data on the communication lines 12 to 17 such that these communication lines 12 to 17 are fully used. As shown, in one-half second one frame of I picture data is sent out on the 1-st and 2-nd hierarchy communication lines. In the same period four frames of P picture data are sent out on the 3-rd and 4-th hierarchy communication lines. Also, in the same period ten frames of B picture data is sent out on the 5-th and 6-th hierarchy communication lines.

As shown above, in this embodiment, unlike the prior art system, the coded moving picture data hierarchy formation is realized without use of MC and DCT coding but by using the I, P and B picture data and the low and high DCT components thereof. It is thus possible to realize the hierarchy formation with a simple construction and without reducing the coding efficiency.

Figure 8:
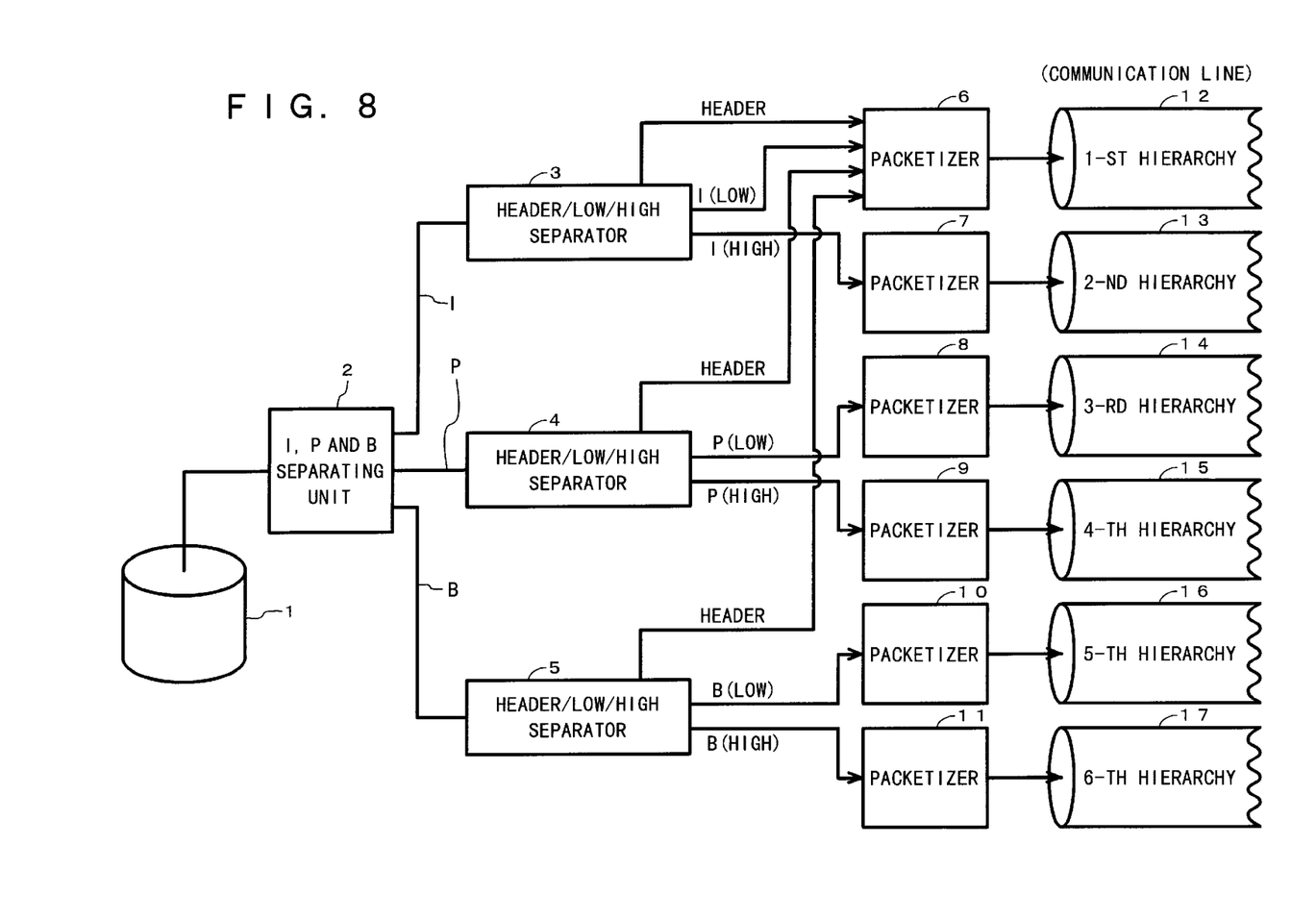
FIG. 8 is a block diagram showing a second embodiment of the invention.

A second embodiment of the invention will now be described with reference to FIG. 8. This embodiment is a hierarchy forming apparatus suitable for an MPEG system. It is the same as the preceding first embodiment except for that the I, P and B picture headers separated in the 1-st to 3-rd header/low/high separators 3 to 5, are supplied to the packetizer 6 for the 1-st hierarchy. In FIG. 8, reference numerals like those in FIG. 1 designate like or equivalent parts.

Figure 9:
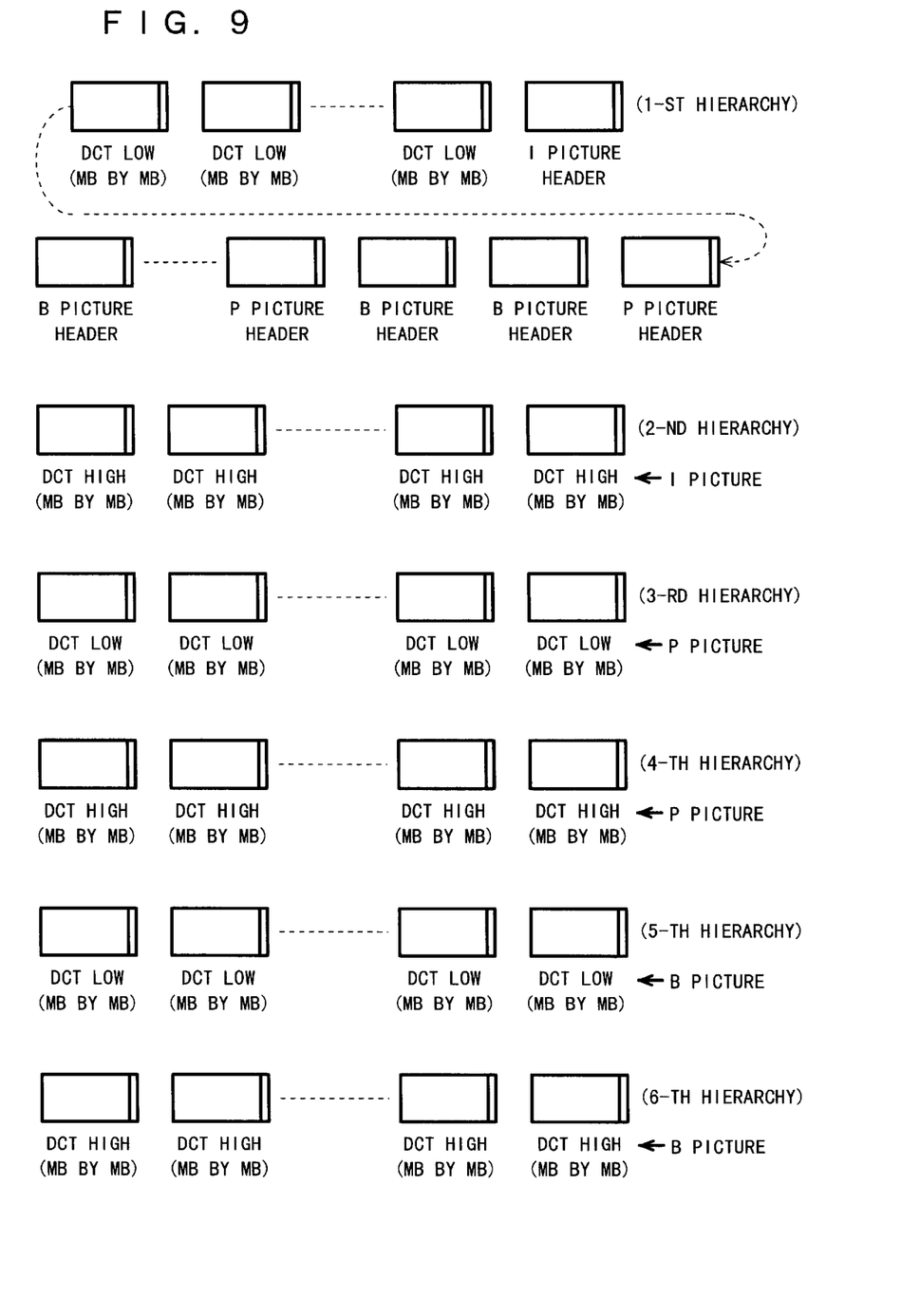
FIG. 9 is a view referred to the description of a time sequence of hierarchy-by-hierarchy transmitted data in the second embodiment.

As shown in FIG. 9, in this embodiment the packetizer 6 for the 1-st hierarchy packetizes I picture header, and then MB-by-MB packetizes low frequency DCT components of the I picture data in one frame. After packetizing one frame in the above way, the packetizer 6 then packetizes P and B picture headers in the order of the I, P and B prediction constitution as described before in connection with FIG. 3; specifically it packetizes P picture header, B picture header, B picture header, P picture header, . . . .

The packetizer 7 for the 2-nd hierarchy packetizes high frequency DCT components of I picture data in one frame. The packetizer 8 for the 3-rd hierarchy packetizes low frequency DCT components of P picture data. The packetizer 9 for the 4-th hierarchy packetizes the high frequency DCT components of P picture data. The packetizers 10 and 11 for the 5-th and 6-th hierarchies packetize low and high DCT components of B picture data, respectively.

As shown above, in this embodiment the packetizer 6 for the 1-st hierarchy packetizes the I picture header and then the low frequency DCT components of I picture data in one frame, and then packetizes the P and B picture headers in the order of the I, P and B prediction constitution, while sending out the packetized data to the communication line 12. It is thus possible to adapt the embodiment to be in conformity with the MPEG specifications.

Figure 10:
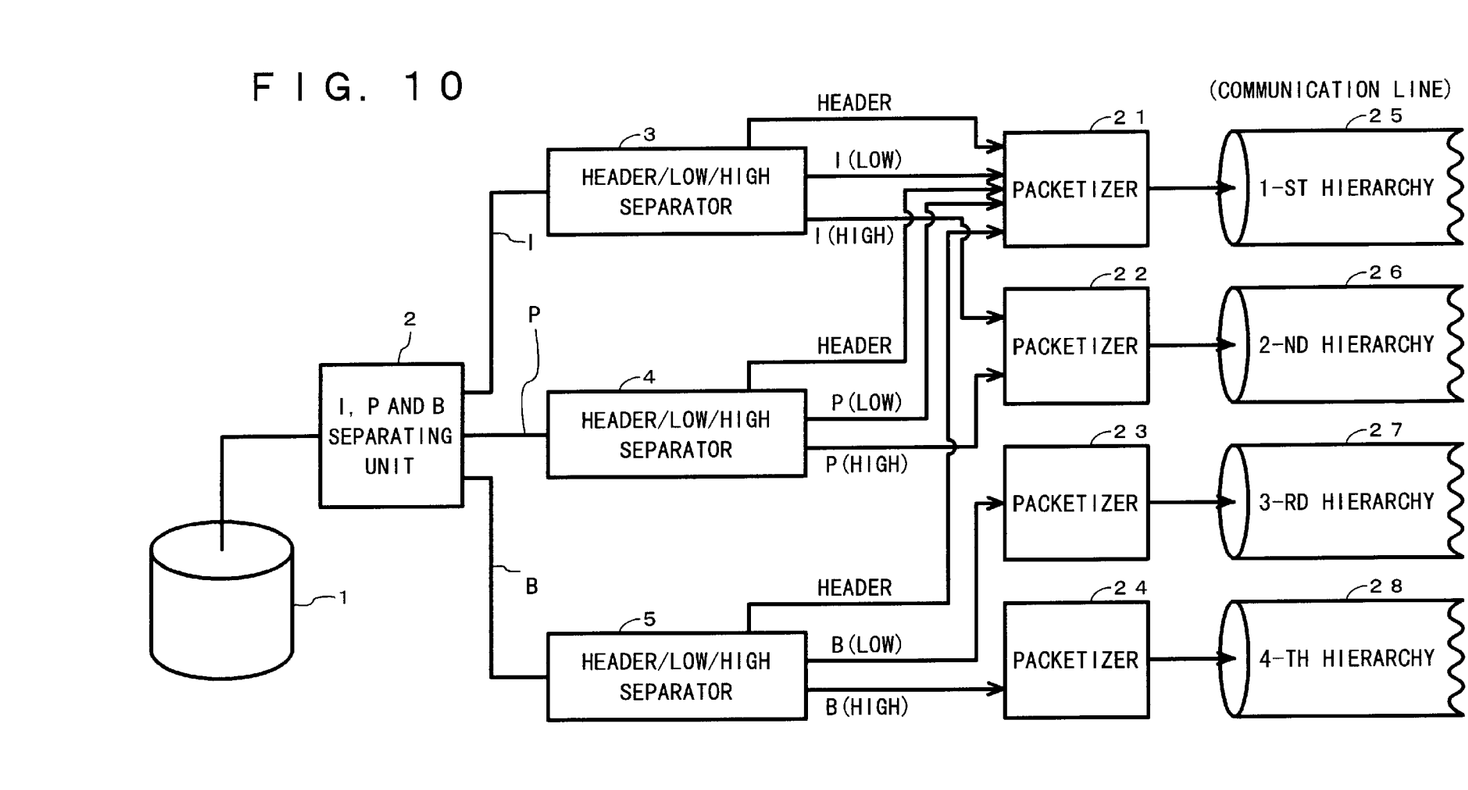
FIG. 10 is a block diagram showing a third embodiment of the invention.

A third embodiment of the invention will now be described with reference to FIG. 10. In the Figure, reference numerals 21 to 24 designate packetizers, and reference numerals 25 to 28 designate communication lines for the 1-st to 4-th hierarchies. Other reference numerals like those in FIG. 1 designate like or equivalent parts. And I, P1, P2, B1, B2, B3, etc. in FIG. 11 designate like those in FIG. 3.

In this embodiment, the low frequency DCT components of the I and P picture data and the I, P and B picture headers, are supplied to the packetizer 21 for the 1-st hierarchy. The high frequency DCT components of the I and P picture data are supplied to the packetizer 22 for the 2-nd hierarchy. The low and high DCT components of the B picture are supplied to the packetizers 23 and 24 for the 3-rd and 4-th hierarchies, respectively.

Figure 11:
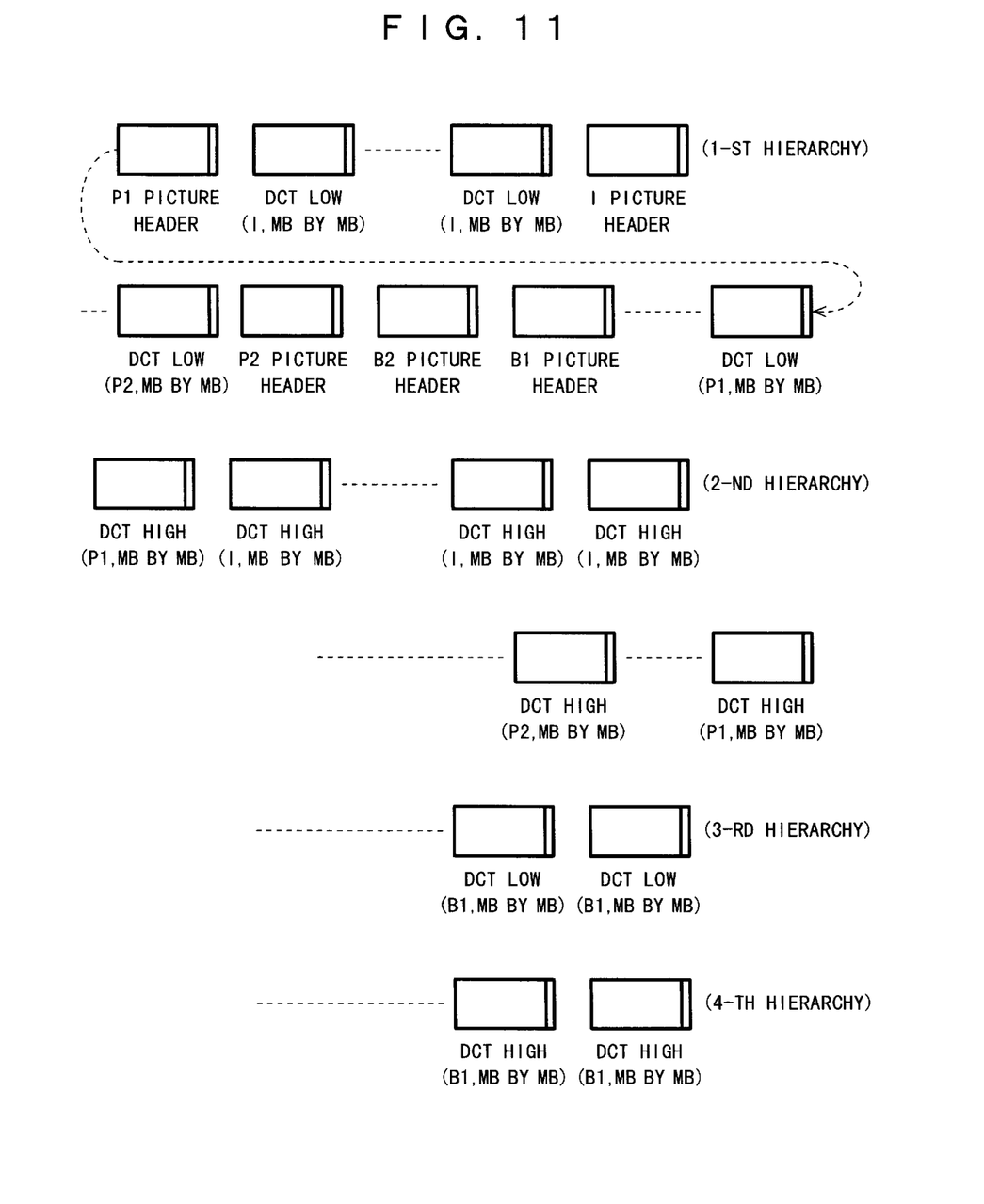
FIG. 11 is a view referred to the description of a time series of hierarchy-by-hierarchy transmitted data in the third embodiment.

As shown in FIG. 11, in this embodiment the packetizer 21 for the 1-st hierarchy packetizes I picture header, and then MB-by-MB packetizes low frequency DCT components of I picture. After packetizing one frame in the above way, the packetizer 21 then packetizes P1 picture header, and then MB-by-MB packetizes low frequency DCT components of P1 picture. Then the packetizer 21 packetizes B1 and B2 picture headers and then P2 picture header, and then packetizes low frequency DCT components of P2 picture in one frame.

The packetizer 22 for the 2-nd hierarchy packetizes high frequency DCT components of I picture in one frame, and then high frequency DCT components of P1 to P4 pictures. The packtizer 23 for the 3-rd hierarchy packetizes low frequency DCT components of B1 to B10 picture data. The packetizer 24 for the 4-th hierarchy packetizes high frequency DCT components of B1 to B10 picture data.

Figure 12:
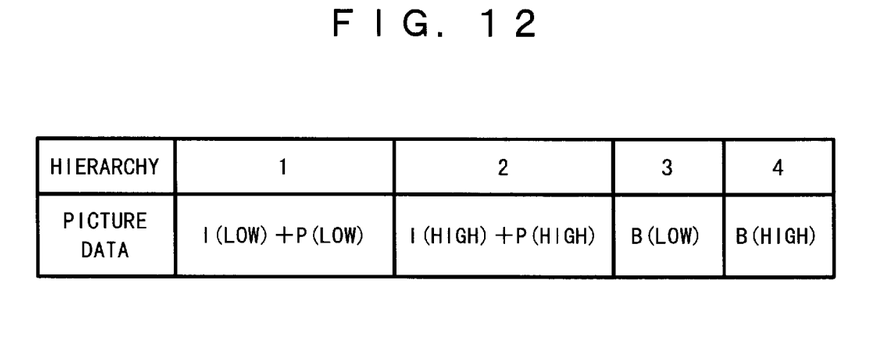
FIG. 12 is a view referred to the description of the hierarchy-by-hierarchy transmitted data in the third embodiment.

FIG. 12 summarizes the above description. As shown, the packetized moving picture data is sent out in four hierarchies. In this case, higher priority orders are given to hierarchies of lower orders. As the 1-st hierarchy which is of the highest order, low frequency DCT components of I picture data and low frequency DCT components of P1 to P4 picture data are sent out. As the 2-nd hierarchy which is of the second highest order, high frequency DCT components of I picture data and high frequency DCT components of P1 to P4 picture data are sent out. As the 3-rd hierarchy of the third highest order, low frequency DCT components of B1 to B10 picture data are sent out. As the 4-th hierarchy of the fourth highest order, high frequency DCT components of B1 to B10 picture data are sent out.

Figure 13:
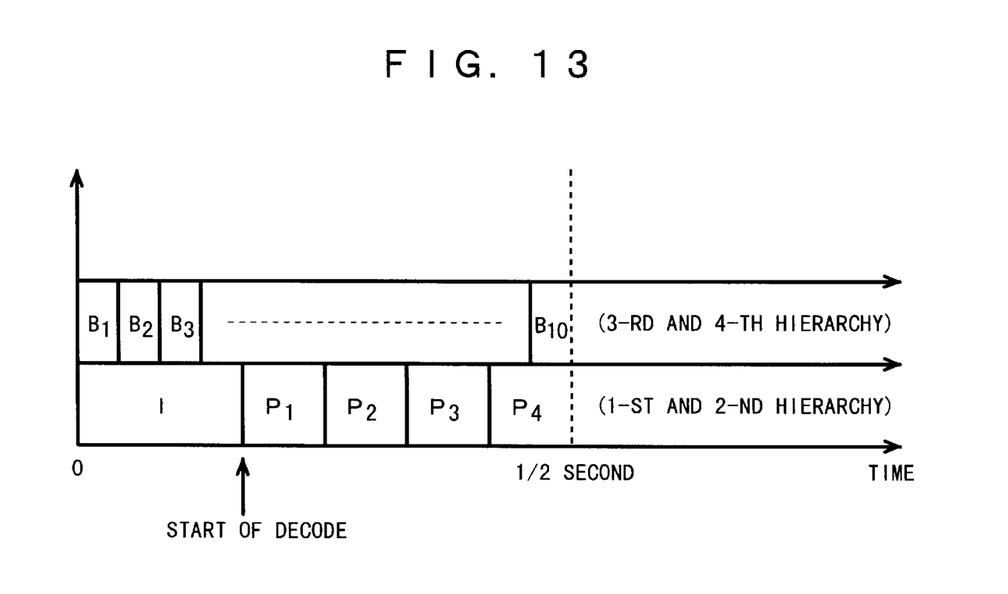
FIG. 13 is a time chart of the hierarchy-by-hierarchy transmitted data in the third embodiment.

FIG. 13 is a timing chart of transmission of the packetized data on the communication lines 25 to 28 such that these communication lines 25 to 28 are fully used. As shown, in one-half period a total of five frames of I and P1 to P4 picture data are sent out on the communication lines for the 1-st and 2-nd hierarchies. In the same period of time 10 frames of B1 to B10 picture data are sent out on the communication lines for the 3-rd and 4-th hierarchies.

This embodiment is described under assumption that it is adapted to be in conformity with the MPEG specifications, but this is by no means limitative. For example, the header separated in the 3-rd header/low/high separator 5 shown in FIG. 10, may be packetized in the packetizer 23 for the 3-rd hierarchy, instead of the packetizer 21 for the 1-st hierarchy.

In this embodiment, as shown in FIG. 13, it is possible to obtain, in addition to the advantages of the previous first and second embodiments, an advantage that the decoder can start decoding upon reception of I picture data, that is, it can decode data more quickly than in the first and second embodiments. In the first and second embodiments, arranging such as to eliminate no data transmission time in each hierarchical channel, results in increased delay. I picture data appears once in, for instance, one-half second (i.e., 500 milliseconds). This means that a time of 500 milliseconds is necessary until I picture data completely appears at the receiving side. In this case, a delay of 500 milliseconds is always generated until the start of the decoding, as shown in FIG. 7, because P picture data cannot be decoded unless I picture data is provided. In this embodiment, however, the decoding can be started at an earlier time, as is obvious from FIG. 13.

Figure 14:
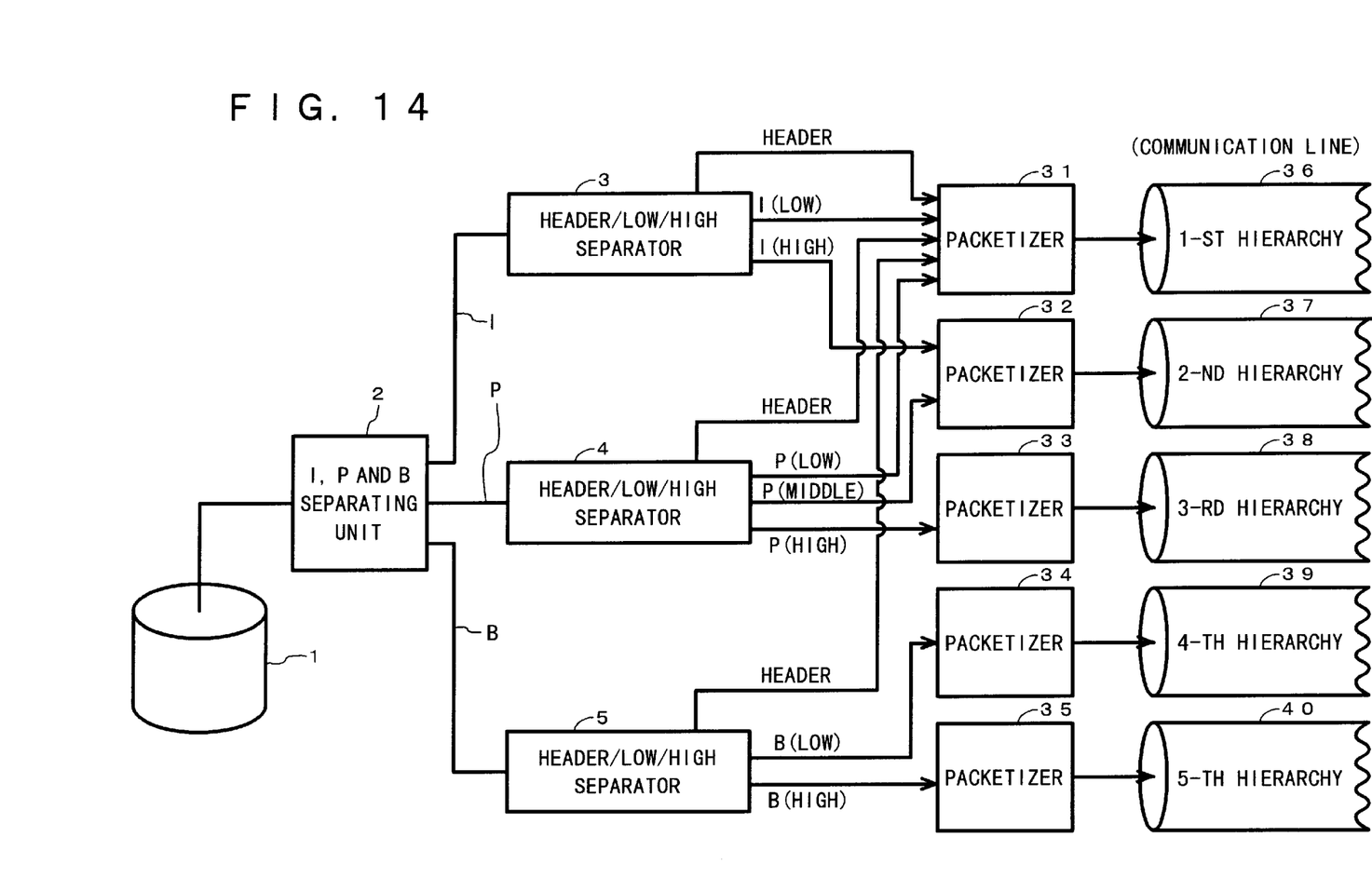
FIG. 14 is a block diagram showing a fourth embodiment of the invention.

A fourth embodiment of the invention will now be described with reference to FIG. 14. In the Figure, reference numerals 31 to 35 designate packetizers for 1-st to 5-th hierarchies, and reference numerals 36 to 40 designate communication lines for the 1-st to 5-th hierarchies. Other reference numerals like those in FIG. 1 designate like or equivalent parts.

In this embodiment, the low frequency DCT components of I and P picture and the headers of I, P and B picture data are supplied to the packetizer 31 for the 1-st hierarchy. The high frequency DCT components of the I picture data and the intermediate frequency DCT components of the P picture data are supplied to the packetizer 32 for the 2-nd hierarchy. The high frequency DCT components of the P picture data are supplied to the packetizer 33 for the 3-rd hierarchy. The low frequency DCT components of the B picture data are supplied to the packetizer 34 for the 4-th hierarchy. The high frequency DCT components of the B picture data are supplied to the packetizer 35 for the 5-th hierarchy. The intermediate frequency DCT components may be in the area between bold lines z1 and z2 in FIG. 4. Also, the high frequency DCT components may be in the right lower area under the bold line z2.

Figure 15:
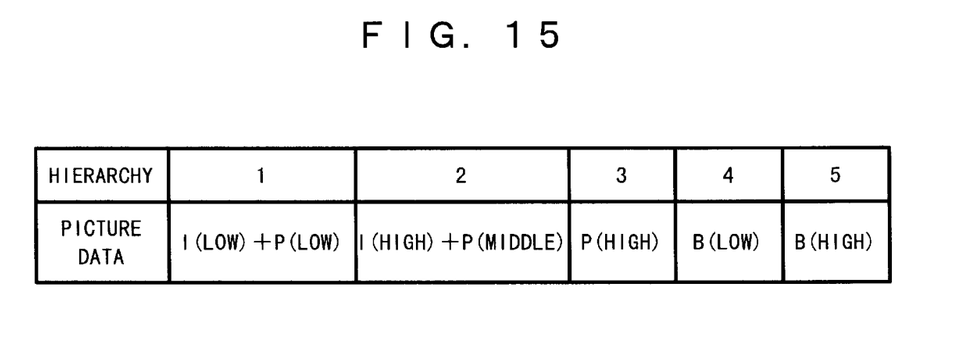
FIG. 15 is a view referred to the description of hierarchy-by-hierarchy transmitted data in the fourth embodiment.

FIG. 15 illustrates data transmission in the five hierarchies in this embodiment. In this case, higher priority orders are given to hierarchies of lower orders. As the 1-st hierarchy which is of the highest order, low frequency DCT components of I picture data and low frequency DCT components of P1 to P4 picture data are sent out. As the 2-nd hierarchy which is of the second highest order, high frequency DCT components of I picture data and intermediate frequency DCT components of P1 to P4 picture data are sent out. As the 3-rd hierarchy which is the third highest order, high frequency DCT components of P1 to P4 picture data are sent out. As the 4-th hierarchy which is the fourth highest order, low frequency DCT components of B1 to B10 picture data are sent out. As the 5-th hierarchy which of the fifth highest order, high frequency DCT components of B1 to B10 picture data are sent ut.

Figure 16:
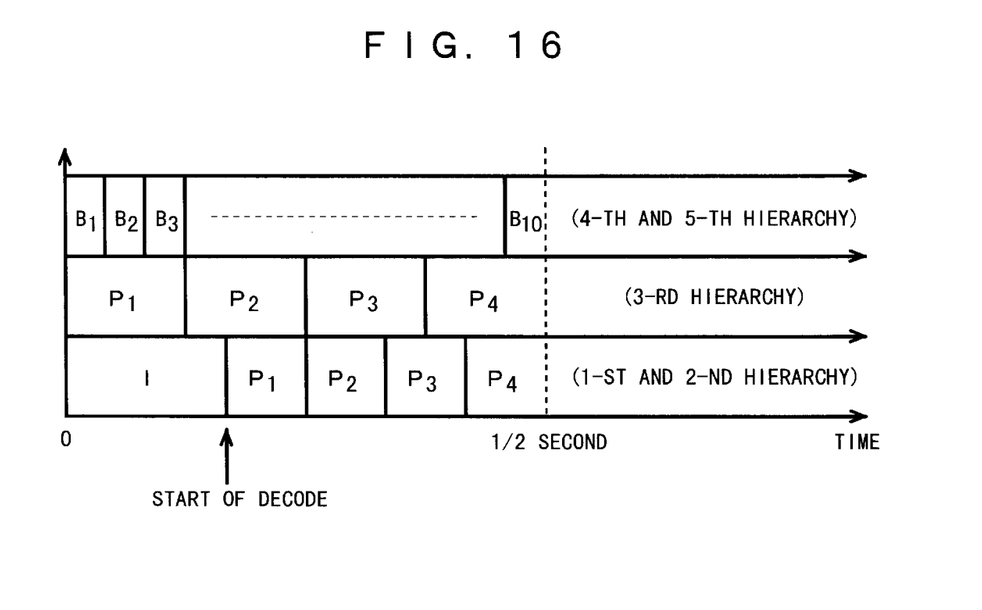
FIG. 16 is a time chart of the hierarchy-by-hierarchy transmitted data in the fourth embodiment.

FIG. 16 is a timing chart illustrating the transmission of the packetized data on the communication lines 36 to 40 such that these communication lines 36 to 40 are fully used. As shown, in one-half second one data frame of low and high DCT components of I picture data and four frames of low and intermediate frequency DCT components of P1 to P4 picture data are sent out on the communication lines of the 1-st and 2-nd hierarchies. In the same period of time, four frames of high frequency DCT components of P1 to P4 picture data are sent out on the communication line for the 3-rd hierarchy. Also, in the same period of time, ten frames of B1 to B10 picture data are sent out on the communication lines for the 3-rd and 4-th hierarchies.

In this embodiment, the same advantages as in the third embodiment are obtainable.

While typical embodiments of the invention have been described, they are by no means limitative, various changes and modifications may be made. Essentially, using the I, P and B picture and the low, intermediate and high frequency DCT components thereof in combination in coded moving picture data hierarchy forming systems, is covered in the invention.

As has been described in the foregoing, according to the invention hierarchies are formed by combining I, P and B picture data of moving pictures and low and high frequency DCT components of these picture data. Thus, unlike the prior art, easy and quick hierarchy formation is obtainable without need of executing the operation of the MC and DCT coding a plurality of times. In addition, it is possible to provide a method of and an apparatus for hierarchy formation suited for MPEG, by assigning the headers of the I, P and B picture data to the 1-st hierarchy which is of the utmost importance.

What is claimed is:

1. A method of coded moving picture data hierarchy formation, wherein I, P and B picture data of moving picture and low and high DCT components thereof are used in combination for the hierarchy formation and wherein low frequency components of I picture data are assigned to a first hierarchy, high frequency components of I picture data are assigned to a second hierarchy, low frequency components of P picture data are assigned to a third hierarchy, high frequency components of the P picture data are assigned to a fourth hierarchy, low frequency components of B picture data are assigned to a fifth hierarchy, and high frequency components of B picture data are assigned to a sixth hierarchy.

2. The method of coded moving picture data hierarchy formation according to claim 1, wherein headers of I, P and B picture data are assigned to the first hierarchy.

3. The method of coded moving picture data hierarchy formation according to claim 1, wherein low, and high frequency components of I, P and B picture data are packetized and then sent out.

4. The method of coded moving picture data hierarchy formation according to claim 2, wherein low, and high frequency components of I, P and B picture data are packetized and then sent out.

5. A method of coded moving picture data hierarchy formation, wherein I, P and B picture data of moving picture and low and high DCT components thereof are used in combination for the hierarchy formation and wherein low frequency components of I picture data and low frequency components of P picture data are assigned to a first hierarchy, high frequency components of I picture data and high frequency components of P picture data are assigned to a second hierarchy, low frequency components of B picture data are assigned to a third hierarchy, and high frequency components of B picture data are assigned to a fourth hierarchy.

6. The method of coded moving picture data hierarchy formation according to claim 5, wherein headers of I, P and B picture data are assigned to the first hierarchy.

7. The method of coded moving picture data hierarchy formation according to claim 5, wherein low, and high frequency components of I, P and B picture data are packetized and then sent out.

8. The method of coded moving picture data hierarchy formation according to claim 6, wherein low, and high frequency components of I, P and B picture data are packetized and then sent out.

9. A method of coded moving picture data hierarchy formation, wherein I, P and B picture data of moving picture and low and high DCT components thereof are used in combination for the hierarchy formation and wherein low frequency components of I picture data and low frequency components of P picture data are assigned to a first hierarchy, high frequency components of I picture data and intermediate frequency components of P picture data are assigned to a second hierarchy, high frequency components of P picture data are assigned to a third hierarchy, low frequency components of B picture data are assigned to a fourth hierarchy, and high frequency components of B picture data are assigned to a fifth hierarchy.

10. The method of coded moving picture data hierarchy formation according to claim 9, wherein headers of I, P and B picture data are assigned to the first hierarchy.

11. The method of coded moving picture data hierarchy formation according to claim 9, wherein low, intermediate and high frequency components of I, P and B picture data are packetized and then sent out.

12. The method of coded moving picture data hierarchy formation according to claim 10, wherein low, intermediate and high frequency components of I, P and B picture data are packetized and then sent out.

* * * * *

UNITED STATES PATENT AND TRADEMARK OFFICE
CERTIFICATE OF CORRECTION

PATENT NO. : 6,075,900
DATED : June 13, 2000
INVENTOR(S) : Skigeyuki Sakazawa et al.

It is certified that error appears in the above-identified patent and that said Letters Patent is hereby corrected as shown below:

Under [73] Assignee:
Insert -- Kokusai Denshin Denwa Kabushiki Kaisha --

Signed and Sealed this

Eleventh Day of September, 2001

Attest:

*Nicholas P. Godici*

NICHOLAS P. GODICI
*Attesting Officer*        *Acting Director of the United States Patent and Trademark Office*